(12) United States Patent
Keysers et al.

(10) Patent No.: US 10,498,676 B2
(45) Date of Patent: Dec. 3, 2019

(54) CONTEXTUAL AUTOMATIC GROUPING (71) Applicant: Google LLC, Mountain View, CA (US)

(72) Inventors: Daniel M. Keysers, Stallikon (CH);
Victor Carbune, Basel (CH); Thomas Deselaers, Zurich (CH)

(73) Assignee: Google LLC, Mountain View, CA (US)

( * ) Notice: Subject to any disclaimer, the term of this patent is extended or adjusted under 35 U.S.C. 154(b) by 169 days.

(21) Appl. No.: 15/291,152

(22) Filed: Oct. 12, 2016

(65) Prior Publication Data
US 2018/0102999 A1   Apr. 12, 2018

(51) Int. Cl.
*H04L 12/58* (2006.01)
*H04L 29/08* (2006.01)
*H04L 29/06* (2006.01)
*G06Q 10/00* (2012.01)
*G06Q 10/06* (2012.01)
(Continued)

(52) U.S. Cl.
CPC ............ *H04L 51/10* (2013.01); *G06Q 10/00* (2013.01); *G06Q 10/06311* (2013.01); *G06Q 10/1095* (2013.01); *G06Q 50/01* (2013.01); *H04L 51/04* (2013.01); *H04L 67/22* (2013.01); *H04L 67/24* (2013.01); *H04L 67/306* (2013.01); *H04L 67/42* (2013.01)

(58) Field of Classification Search
CPC ......... H04L 51/10; H04L 67/24; H04L 67/22; H04L 67/42; H04L 67/306; H04L 51/04; G06F 19/00; G06Q 50/01; G06Q 10/1095; G06Q 10/06311; G06Q 10/00
See application file for complete search history.

(56) References Cited

U.S. PATENT DOCUMENTS 9,043,329 B1    5/2015 Patton et al.
2008/0235349 A1*   9/2008 Caspi ............... G06Q 10/10
                                                        709/218
(Continued)

OTHER PUBLICATIONS

Conger, "Facebook says it's not making friend suggestions based on your location after all," TechCrunch, Jun. 28, 2016 [retrieved on Oct. 6, 2016]. Retrieved from the Internet: URL<https://techcrunch.com/2016/06/28/facebook-says-its-not-making-friend-suggestions-based-on-your-location-after-all/>, 7 pages.
(Continued)

*Primary Examiner* — Michael A Keller
(74) *Attorney, Agent, or Firm* — Fish & Richardson P.C.

(57) ABSTRACT

Methods, systems, and apparatus, including computer programs encoded on a computer storage medium, for performing event detection are disclosed. In one aspect, a method a computing system that receives data from a first computing device associated with a first user that indicates a current context of the first user. The method includes identifying a subset of users associated with the first user based on the current context of the first user, and receiving data indicating a current context of the at least one other user. The method compares the current context of the first user with the current context of the at least one other user and determines that a shared event is presently occurring or has occurred. The shared event can be an event associated with the first user and the at least one other user of the subset of users. The method then indicates, at least to the first user, that the shared event is presently occurring or has occurred.

21 Claims, 4 Drawing Sheets

(51) Int. Cl.
    *G06Q 10/10*     (2012.01)
    *G06Q 50/00*     (2012.01)

(56) References Cited

U.S. PATENT DOCUMENTS

| | | |
|---|---|---|
| 2009/0319472 A1 | 12/2009 | Jain et al. |
| 2013/0031475 A1* | 1/2013 | Maor ............... G06Q 10/10 715/706 |
| 2013/0170819 A1* | 7/2013 | Dykeman ........ H04N 21/41407 386/299 |
| 2013/0173728 A1 | 7/2013 | Starenky et al. |
| 2013/0212176 A1* | 8/2013 | Koulomzin ............ G06Q 50/01 709/204 |
| 2014/0200974 A1* | 7/2014 | Morin ............... G06Q 30/0217 705/14.19 |

OTHER PUBLICATIONS

Cook et al., "Detection of Social Interaction in Smart Spaces," Cybern Syst., 41(2):90-104, Feb. 1, 2010.

Do et al., "Human Interaction Discovery in Smartphone Proximity Networks," Personal and Ubiquitous Computing 17(3):413-431, Mar. 2013.

Dong et al., "Multiscale event detection in social media," Data Min Knowl Disc, 29:1374-1405, Jun. 2015.

Li et al., "Multi-Modal In-Person Interaction Monitoring Using Smartphone and On-Body Sensors," 2013 IEEE International Conference on Body Sensor Networks, pp. 1-6, May 2013.

Office Action issued in British Application No. GB 1715646.4, dated Feb. 19, 2018, 7 pages.

\* cited by examiner

CONTEXTUAL AUTOMATIC GROUPING

FIELD

The present specification is related to mobile devices.

BACKGROUND

Activities that connect a group of users often result in situations where it would be useful to receive notifications indicating that certain members of a user group are participating in the same event. In the context of computing systems, the notification can be received at user device while the event is occurring or at a later time after the event has concluded.

SUMMARY

A computing system is described that automatically detects that a shared event is taking place or took place. This specification describes processes for receiving and analyzing data signals from user devices associated with individual users within a user group to detect the occurrence of a shared event. Participation or association in the event can be shared among at least two users of the group. Detection of the event can include, for example, the computing system analyzing data signals provided by devices associated with the users to determine that at least two users in the group have a connection that predates the occurrence of the event. Values of the data signals can indicate that the at least two users are participating in, or at least are associated with, the same shared event.

In one innovative aspect of the specification, a computer-implemented method is described, that includes receiving, by a computing system and from a first computing device associated with a first user, data indicating a current context of the first user and identifying, by the computing system and from a set of users, a subset of users associated with the first user based on the current context of the first user. The method includes, receiving, by the computing system and from a second computing device associated with at least one other user of the subset of users, data indicating a current context of the at least one other user, and comparing, by the computing system, the current context of the first user with the current context of the at least one other user. The method further includes, determining, by the computing system and based on the comparing, that a shared event is presently occurring or has occurred, the shared event being an event associated with the first user and the at least one other user of the subset of users. The method still further includes, indicating, by the computing system and at least to the first user, that the shared event is presently occurring or has occurred.

In some implementations, identifying the subset of users includes determining, by the computing system, that a user of the subset of users has a connection to the first user. In one aspect of this implementation, the connection indicates that the user has at least one of corresponded with the first user, is a contact in a device of the first user, or is associated with a social network of the first user. In some implementations, comparing the current context of the first user with the current context of the at least one other user includes receiving, by the computing system, a first set of data signals from the first user and a second set of data signals from the at least one other user; and detecting, by the computing system, an overlap in a value associated with the first set of data signals and a value associated with the second set of data signals, the overlap indicating a probability of an occurrence of the shared event.

In an aspect of this implementation, the first set of data signals and the second set of data signals each include data signals corresponding to at least one of location data, ambient noise level data, digital beacon data, digital image data, internet activity data, or digital communications data. In another aspect, determining whether the shared event is presently occurring or has occurred includes, detecting, that the probability of the occurrence of the shared event exceeded a threshold probability. In yet another aspect, indicating, by the computing system and at least to the first user, that the shared event is presently occurring or has occurred, is in response to the computing system detecting that the probability of the occurrence of the shared event exceeded the threshold probability. In another implementation, the shared event is at least one of associated with a physical location or associated with a virtual computing environment.

In another innovative aspect of the specification, an electronic system is described, including one or more processing devices; one or more machine-readable storage devices for storing instructions that are executable by the one or more processing devices to perform operations including, receiving, by the electronic system and from a first computing device associated with a first user, data indicating a current context of the first user. The operations also include, identifying, by the electronic system and from a set of users, a subset of users associated with the first user based on the current context of the first user, and receiving, by the electronic system and from a second computing device associated with at least one other user of the subset of users, data indicating a current context of the at least one other user.

The operations further include, comparing, by the electronic system, the current context of the first user with the current context of the at least one other user, and determining, by the electronic system and based on the comparing, that a shared event is presently occurring or has occurred, the shared event being an event associated with the first user and the at least one other user of the subset of users. The operations still further include, indicating, by the electronic system and at least to the first user that the shared event is presently occurring or has occurred.

In some implementations, identifying the subset of users includes, determining, by the electronic system, that a user of the subset of users has a connection to the first user, and wherein the connection indicates that the user has at least one of corresponded with the first user, is a contact in a device of the first user, or is associated with and/or connected in a social network of the first user. In some implementations, comparing the current context of the first user with the current context of the at least one other user includes, receiving, by the electronic system, a first set of data signals from the first user and a second set of data signals from the at least one other user; and detecting, by the electronic system, an overlap in a value associated with the first set of data signals and a value associated with the second set of data signals, the overlap indicating a probability of an occurrence of the shared event.

In one aspect of this implementation, the first set of data signals and the second set of data signals each include data signals corresponding to at least one of location data, ambient noise level data, digital beacon data, digital image data, internet activity data, or digital communications data. In another aspect, determining whether the shared event is presently occurring or has occurred includes, detecting, that the probability of the occurrence of the shared event exceeded a threshold probability. In yet another aspect, indicating, by the electronic system and at least to the first user, that the shared event is presently occurring or has occurred, is in response to the electronic system detecting that the probability of the occurrence of the shared event exceeded the threshold probability.

In yet another innovative aspect, the specification describes one or more machine-readable storage devices storing instructions that are executable by one or more processing devices to perform operations including, receiving, by a computing system and from a first computing device associated with a first user, data indicating a current context of the first user and identifying, by the computing system and from a set of users, a subset of users associated with the first user based on the current context of the first user. The operations also include, receiving, by the computing system and from a second computing device associated with at least one other user of the subset of users, data indicating a current context of the at least one other user, and comparing, by the computing system, the current context of the first user with the current context of the at least one other user. The operations further include, determining, by the computing system and based on the comparing, that a shared event is presently occurring or has occurred, the shared event being an event associated with the first user and the at least one other user of the subset of users, and indicating, by the computing system and at least to the first user, that the shared event is presently occurring or has occurred.

In some implementations, identifying the subset of users includes determining, by the computing system, that a user of the subset of users has a connection to the first user, and wherein the connection indicates that the user has at least one of corresponded with the first user, is a contact in a device of the first user, or is associated with a social network of the first user. In some implementations, comparing the current context of the first user with the current context of the at least one other user includes receiving, by the computing system, a first set of data signals from the first user and a second set of data signals from the at least one other user; and detecting, by the computing system, an overlap in a value associated with the first set of data signals and a value associated with the second set of data signals, the overlap indicating a probability of an occurrence of the shared event.

In one aspect of this implementation, the first set of data signals and the second set of data signals each include data signals corresponding to at least one of location data, ambient noise level data, digital beacon data, digital image data, internet activity data, or digital communications data. In another aspect, determining whether the shared event is presently occurring or has occurred includes, detecting, that the probability of the occurrence of the shared event exceeded a threshold probability. In yet another aspect, indicating, by the computing system and at least to the first user, that the shared event is presently occurring or has occurred, is in response to the computing system detecting that the probability of the occurrence of the shared event exceeded the threshold probability.

The subject matter described in this specification can be implemented in particular embodiments and can result in one or more of the following advantages. The computing system of this specification removes the need to define an explicit event, but instead automatically analyzes data signals to detect that occurrence of a shared event. By not defining a multitude of explicit events, computing system processes are optimized and processing efficiency in an example computing environment is improved by minimizing unnecessary computations for event definitions. Shared connections between users are efficiently determined based on, for example, preexisting data communications and social network affiliations. Data signal analysis of user devices that are not associated with a subset of users is avoided thereby providing enhanced system bandwidth for other computations and system transmissions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
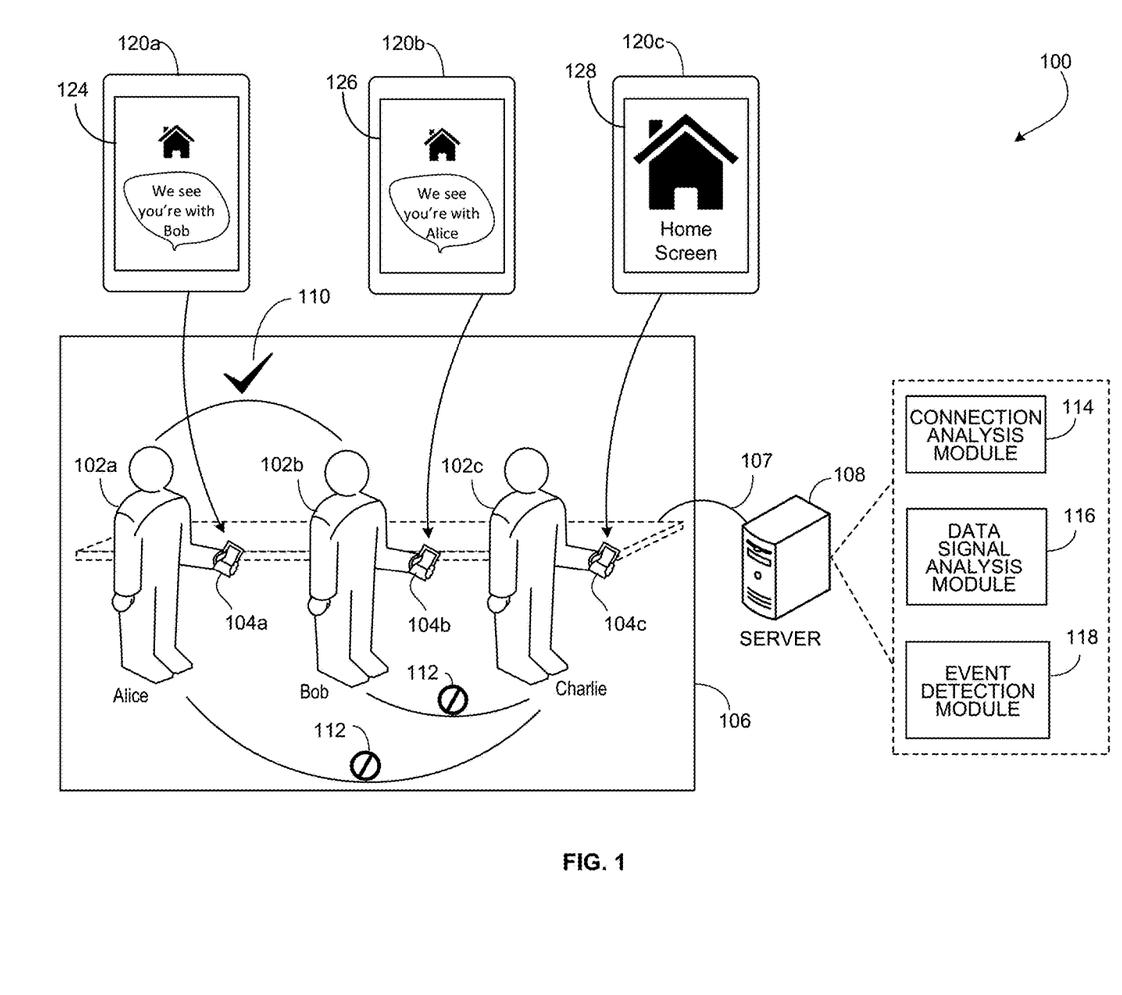
FIG. 1 is an example computing system for automatic detection of an event shared among at least two users of a user group.

FIG. 1 is an example computing system 100 for automatic detection of an event shared among at least two users of a user group. System 100 generally includes user devices 104a/b/c and corresponding users 102a/b/c. As shown, user device 104a is associated with, or owned by, user 102a—Alice, user device 104b is associated with, or owned by, user 102b—Bob, and user device 104c is associated with, or owned by, user 102c—Charlie. Example user devices 104a/b/c include smartphones, laptop/desktop computers, smart televisions, gaming consoles, tablet devices or other related computing device. As described herein, Alice, Bob and Charlie can form an example user group. In certain implementations, a subset of the example user group can include Alice and Bob, Alice and Charlie, or Bob and Charlie.

System 100 detects the occurrence of an event in which participation or association with the event is shared among a subset of users of a larger user group, users 102a/b/c. A computing device 104a of a first user 102a in the group provides data signals to server 108 that indicate, at least, a current context of the first user 102a, such as a physical, e.g., restaurant, or virtual environment, e.g., online meeting. System 100 can use the current context, and related data signal parameters, of the first user 102a to identify another user(s) 102b to form the subset of users 102a/b. A computing device 104b of the other user 102b in the subset can also provide data signals to server 108. System 100 can then compare parameter values of signal data provided by the first user 102a with parameter values of signal data provided by the other user 102b.

For example, system 100 can receive sets of parameter signals from the devices 104a/b of the respective users in the subset, i.e., first user 102a and the other user 102b. The parameter signals can include location data and temporal data for the respective users 102*a/b*. System 100 can compare location and temporal data for the first user 102*a* with location and temporal data for the other user 102*b*. If the comparison shows that parameter values provided by devices 104*a/b* of each user 102*a/b* in the subset either overlap or substantially match, then system 100 can determine that users 102*a/b* in the subset are participating in, or associated with, the same event. System can then indicate to the users 102*a/b* of the subset that a shared event is occurring or has occurred.

In general, server 108 executes a variety of functions associated with signals/parameter analysis, including probability determinations for reliable and accurate detection of the occurrence of a shared event between at least two users 102. In response to detecting the occurrence of a shared event, system 100 indicates to at least one of user 102*a/b/c* that a subset of the users of a larger user group are all associated with a shared event.

For example, regarding user 102*a*—Alice, system 100 can provide a text display on user device 104*a* to indicate, to Alice, that Alice and user 102*b*—Bob are both involved in a shared event or common activity. As shown, UI 124 of Alice's user device 104*a* can include a short message service (SMS) based notification that indicates system 100 has detected or determined that Alice is with Bob, i.e., that users 102*a* and 102*b* are participating in a shared event. Likewise, UI 126 of Bob's user device 104*b* can also include a SMS notification that indicates system 100 has detected or determined that Bob is with Alice, i.e., that users 102*b* and 102*a* are participating in a shared event.

In addition to or in lieu of the SMS text display notification viewable on Alice's device, in some implementations, user device 104*a/b/c* can be configured to include text-to-speech output functionality. In these implementations, the text-to-speech function of user device 104*a/b/c* can be activated to cause the device to speak or output audio in a natural manner as it relates to human speech. For example, the audio output can correspond to the contents of the SMS text notification of UI 124. In some instances, the text-to-speech function can be activated manually by user 102*a/b/c*. In other instances, the text-to-speech function can be activated automatically by a processor of the device in response to system 100 detecting the occurrence of a shared event.

As shown, connection 110 can be a confirmatory indication that Alice and Bob are both participating in a shared event. In contrast, no connection 112 can be a confirmatory indication that user 102*c*—Charlie is not associated with, or participating in, the shared event that includes Alice and Bob. Accordingly, UI 128 of Charlie's user device 104*c* will not include an SMS or other related notification because system 100 has not detected or determined that Charlie is with Alice or Bob, or that user 102*c* is participating in a certain shared event.

In some alternative implementations, connection 110 can indicate that Alice and Bob share a connection that predates the occurrence of the shared event. In contrast, no connection 112 can indicate that, although Alice, Bob, Charlie are each a part of a larger user group, no connection exists between Alice and Charlie or between Bob and Charlie that predates the occurrence of the shared event. As described in more detail below, a connection 110 that predates the occurrence of a shared event can be a precursory factor used by server 108 and system 100 to, in part, detect that a subset of users are involved in a shared event.

As described in more detail below, processes carried out by system 100 can be associated with events or activities that occur in connection with environment 106. In some implementations, environment 106 can be a virtual environment 106, a physical environment 106, or a mixed environment 106 that includes attributes of both virtual and physical settings. Example mixed environments 106 can include two conference rooms that are connected via a virtual meeting with several people in each conference room, or in a gaming scenario, multiple groups playing in different locations, such as in an ingress game(s).

Example virtual environments 106, and example corresponding events, can include computing sessions associated with virtual meetings, online gaming sessions, audio and/or video teleconferencing, digital broadcasts sessions, e.g., television shows/content streaming events, etc., or any other virtual based or electronic computing session shared between at least two users 102 of a larger user group.

Example physical environments 106 can include venues or locations such as restaurants, movie theaters, sporting arenas, fitness locations, or any other physical venue or location suitable for hosting an event shared between at least two users 102 of a larger user group. Example shared events or shared activities can include at least two users 102 dining at the same restaurant, attending or viewing the same movie showing, attending the same sporting event, e.g., football game or basketball game, etc., running the same race event, e.g., 5K or half marathon, etc., or any other activity/event shared between at least two users 102 of a subset of a larger user group.

As shown in FIG. 1, an example user group can include only three users 102*a*, 102*b* and 103*c*. However, in alternative implementations, an example user group can include multiple users on the order of tens, hundreds or even thousands of users. Likewise, a subset of the larger user group can also include multiple users and will generally include at least two users 102. As indicated above, each user device 104*a/b/c* includes a corresponding display 120*a/b/c*. Display 120*a* can include an example user interface (UI) 124, display 120*b* can include an example user interface (UI) 126, and display 102*c* can include an example user interface (UI) 128.

System 100 includes a computing device/server 108 that receives data signals 107, e.g., non-transitory propagating signals, from at least one or more user devices 102 *a/b/c*. As shown, server 108 can include a connection analysis module 114, a data signal analysis module 116, and an event detection module 118. In some implementations, server 108 can include additional or fewer modules and system 100 can include one or more additional servers or computing devices. Modules 114, 116, and 118 are generally representative of connection analysis and data signal processing functions that can be executed by server 108. Modules 114, 116, 118 are described in more detail below with reference to FIG. 2.

As used in this specification, the term "module" is intended to include, but is not limited to, one or more computers configured to execute one or more software programs that include program code that causes a processing unit(s) of the computer to execute one or more functions. The term "computer" is intended to include any data processing device, such as a desktop computer, a laptop computer, a mainframe computer, a personal digital assistant, a server, a handheld device, or any other device able to process data.

Figure 2:
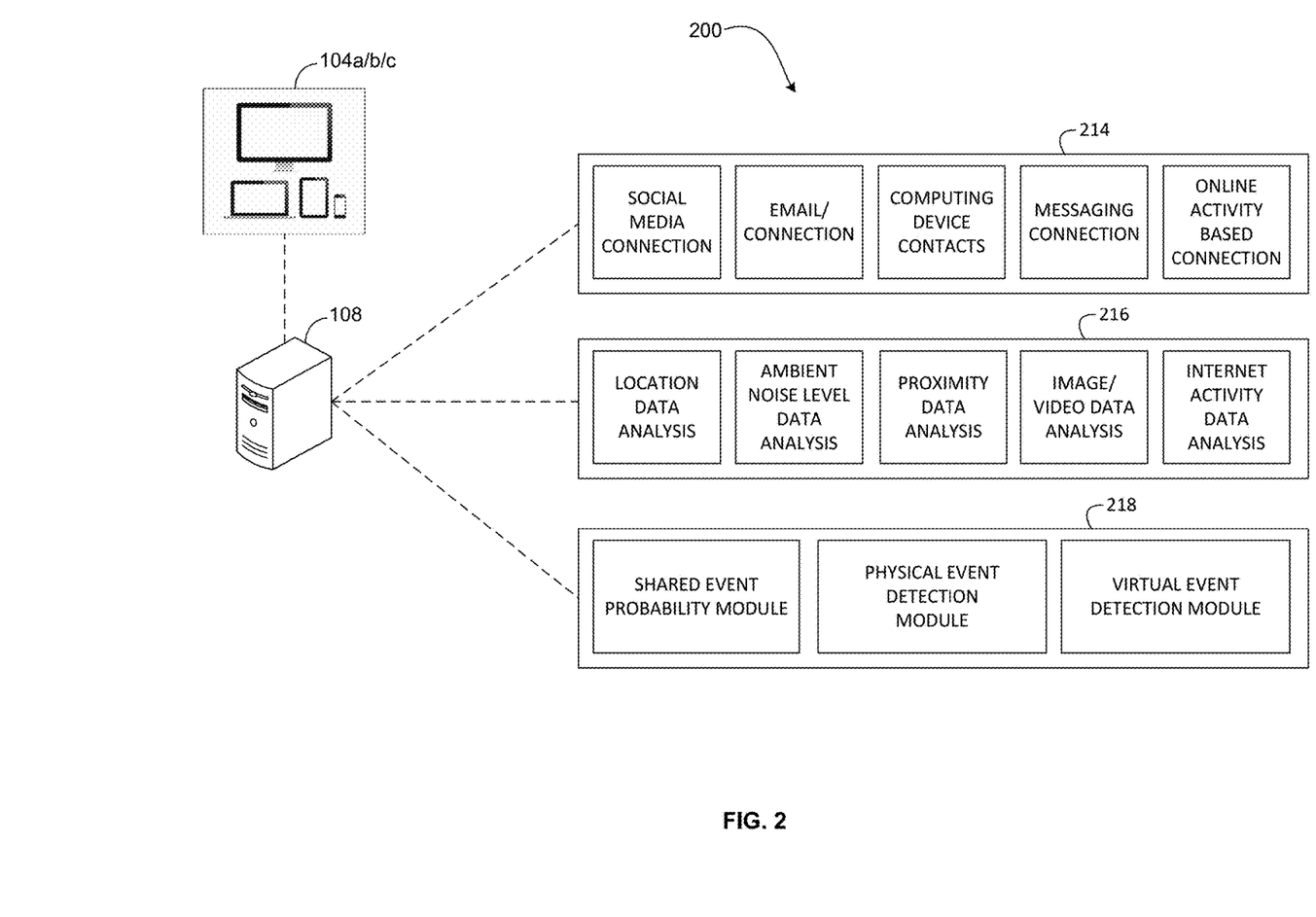
FIG. 2 illustrates a diagram including modules associated with an example computing device of the computing system of FIG. 1.

FIG. 2 illustrates a diagram including module grouping 200 associated with an example computing device of the computing system of FIG. 1. In some implementations, module grouping 200 is associated with server 108 of system 100 and, for example, can be disposed within server 108 or can include independent computing devices that collectively are coupled to and in data communication with server 108. Module grouping 200 generally includes modules 214, 216, and 218. In some implementations, module 214 can correspond to the connection analysis module of system 100, module 216 can correspond to the data signal analysis module of system 100, and module 218 can correspond to the event detection module of system 100.

Figure 3:
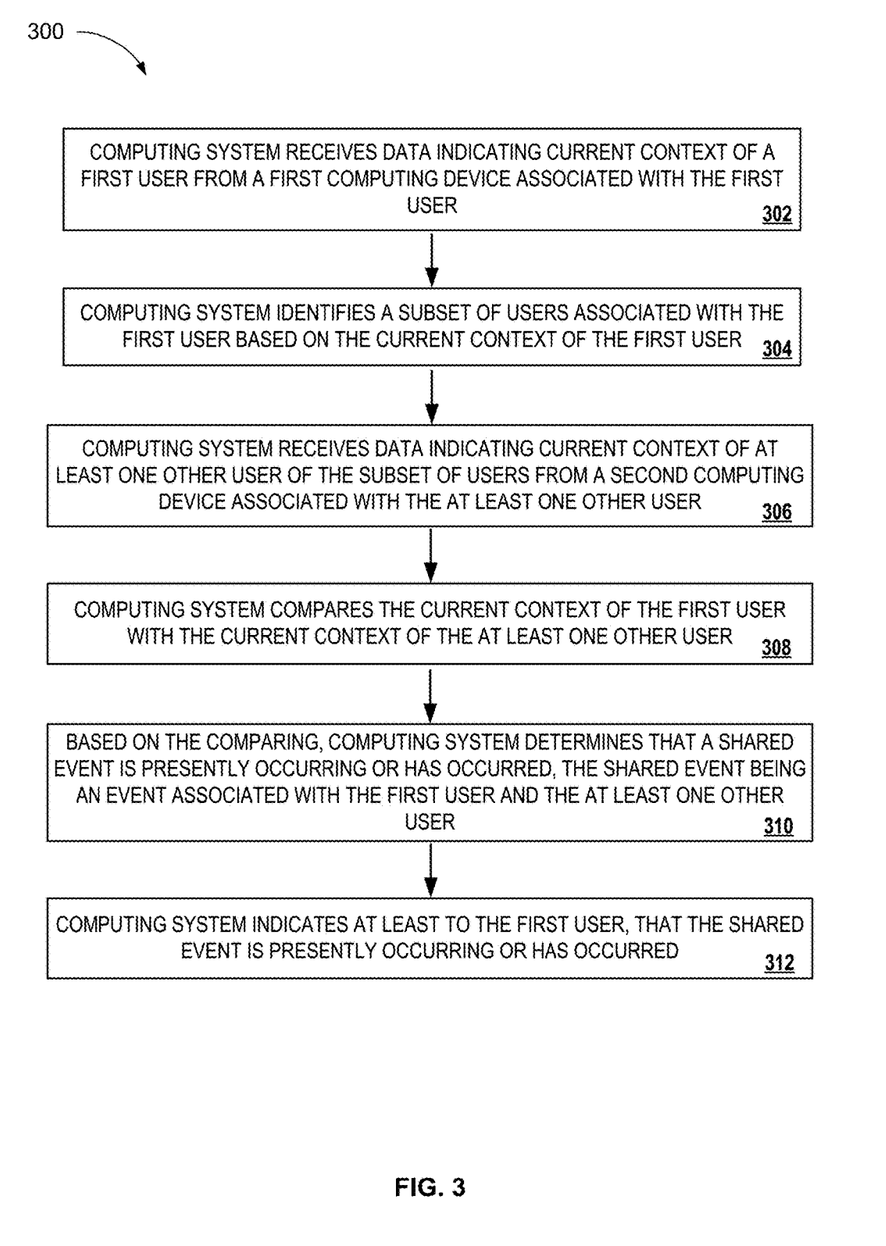
FIG. 3 is a flow diagram of an example process for automatic detection of an event shared among at least two users of a user group.

The description of the embodiments of FIG. 2 and FIG. 3 will reference the above described features of FIG. 1. As discussed above, system 100 can determine that users within a subset of a larger user group are connected to each other, and thus, may share a connection that predates the occurrence of a particular shared event. As described in this specification, a "connection" will correspond primarily to a virtual or electronic based connection that is detected or determined to exist based on analysis, by system 100, of data signals associated with user devices 104a/b/c.

In general, system 100 can be implemented, in part, by execution of program code in the form of an executable application, otherwise known as an "app," that can be launched or executed from user device 104a/b/c. Upon execution of the application program code, the app can then establish a data connection with server 108 to transmit data signals to server 108 as well as receives data signals from server 108. In some implementations, once launched from an example user device 104a/b/c, system 100 can be granted certain permissions by users 102a/b/c. The permissions can cause system 100 to, for example, have access to data associated with one or more other application programs or apps stored within a memory unit of user devices 104a/b/c.

In general, system 100 can be granted permissions to access data associated with example applications such as, social media applications, email applications, messaging applications, contacts applications, global positioning system (GPS) applications, proximity connection applications, e.g., Bluetooth Low Energy (BLE), Near Field Communications (NFC), digital image acquisition or camera applications, virtual meeting/conferencing applications, and online gaming applications.

System 100 can also be granted permissions to access data associated with one or more sensor based applications that include functionality associated with accelerometers, gyroscopes, compasses, or any other sensory application. In some implementations, system 100 can be given permission, by users 102a/b/c, to access data associated with all applications or executable program code stored within corresponding user devices 104a/b/c.

Module 214 can be configured to access data associated with the application programs of user device 104a/b/c to detect or determine if one or more connections exist among users within a large user group. In some implementations, Alice and Bob can share, for example, a connection through one or more social media applications. In one aspect, Alice and Bob can be connected, e.g., are "friends," through an example social media or networking application such as Google+™ A variety of other social media applications can be used as a basis for system 100 to determine or detect that a connection exists between users of a subset.

In general, detection of a shared connection by system 100 can indicate, for example, that users of a subset have at least corresponded with each other prior to occurrence of the shared event. In some instances, users 102a/b—Alice and Bob may be stored as contacts in each other's user device 104 or may be associated with the same social group of a particular social network or social media application. In some implementations, module 214 can scan data communications associated with email or messaging accounts, e.g., Gmail™ and Google Chat™, managed by users 102a/b/c to detect or determine that a connection exists among users within the larger user group.

In other implementations, module 214 can scan data associated with online activities associated with users 102a/b/c such as, for example, data exchanged between users during online gaming sessions, hash-tagging or re-tweeting data communications of certain users, or "liking" certain content posted or uploaded by users within the larger user group. In some instances, module 214 can scan data associated with online activities that occur within a predefined timespan. For example, online activities may include groups that are formed on an ad-hoc basis and, thus, users in the groups may not have easily detectable connections that predate the occurrence of the shared event. Accordingly, certain time-spans can be predefined so that a shared event can be detected for an example scenario in which ad-hoc groups of users share participation in a particular event, such as, an augmented reality game. In other instances, after determining that a shared connection exists among users 102a/b/c within the larger user group, server 108 can use the shared connection data to identify, from a set of users 102a/b/c, a subset of users, e.g., Alice and Bob.

In some implementations, system 100 receives, by way of module 216, data signals that indicate a current context of users 102a/b/c. For example, the current context of users 102a/b/c can be a physical environment or a virtual environment. In alternative implementations, after determining that a shared connection exists among certain users 102a/b/c and/or after receiving a current context of certain users 102a/b/c, server 108 can use the connection data and the current context data to also identify, from a set of users 102a/b/c, a subset of users.

For a given subset of users, i.e., Alice and Bob, module 216 can be configured to access and analyze data signals associated with certain application programs of user device 104a and user device 104b. Responsive to the user connection analysis described above and the data signal analysis, system 100 can detect or determine that a shared event, among Alice and Bob, is either occurring in real-time or has occurred during a past time period. In some implementations, system 100 can use several available signals transmitted by user device 104a/b to determine whether Alice and Bob are taking part or took part in a shared event.

For example, module 216 can receive and analyze a variety of different data signals transmitted by user device 104a/b during execution of certain application programs stored on the user devices. In some implementations, user device 104a and user device 104b each transmit one or more sets of data signals that are received by module 216 of server 108. For example, module 216 can receive data signals from respective user device 104a/b corresponding to at least one of location/GPS data, ambient noise level data, proximity/BLE/NFC data, digital image data such as pictures, video, etc., or internet activity data such as streaming content. Module 216 can also receive data signals corresponding to one or more sensor based applications on user device 104a/b that include device accelerometer data, device gyroscope data, device compass data, or any other data signals associated with other movement based sensory applications of user device 104a/b.

As indicated above, system 100 can receive data signals that indicate a current context, e.g., physical or virtual environment, of users 102 a/b/c. In some implementations, the data signals described in the preceding paragraph are compared between at least two users of a subset of user. The data signals may indicate a current context of the at least two users as well as information indicating certain attributes of the current context. For example, the data signals can indicate that a current context of the at least two users is a physical environment such as a restaurant. Further, certain attributes of the current context can indicate the relative location of the restaurant or other venue location as well as temporal characteristics of a current context, e.g., data and time.

System 100, can compare the current context of the users within the subset, e.g., Alice and Bob. In general, a comparison of the current context can include a comparison of parameter values associated with data signals of each user device 104*a/b* within the subset of users. In some implementations, comparing parameter values associated with data signals of each user device 104*a/b* includes system 100 receiving a first set of data signals from user device 104*a* and a second set of data signals from user device 104*b*. Additionally, comparing the parameter values can further include detecting an overlap in a value associated with the first set of data signals and a value associated with the second set of data signals.

In some implementations, the overlap or substantial match in parameter values indicates a probability of an occurrence of the shared event. For example, if the comparison shows that parameter values provided by user devices 104*a/b* of each user 102*a/b* in the subset either overlap in value or have values that substantially match, then system 100 can determine that users in the subset are participating in, or associated with, the same event. In some instances, a first parameter value can substantially match a second parameter value if one value is within a predefined threshold of the other value. Example thresholds for detecting whether a first parameter value substantially matches a second parameter value can include, one value being within 25%, 50%, or 75% of the other value. The preceding thresholds are examples, and a variety of threshold values can be implemented depending, for example, on the types of parameters that are being compared.

Regarding comparisons of data signals indicating GPS, proximity or location data, system 100 can, for example, compare latitude and longitude positional data for each of user 102*a/b*. In some implementations, system 100 detects or determines the occurrence of a shared event among users 102*a/b* in response to determining that Alice is within a threshold proximity to Bob or that Bob is within a threshold proximity of Alice. For example, parameter values for location data, e.g., latitude and longitude, transmitted by user device 104*a*—Alice can be compared with parameter values for location data transmitted by user device 104*b*—Bob.

In one instance, the relative parameters are compared to determine if there's an overlap or a substantial match between the respective values. In another instance, the respective locations of user 102*a* and 102*b* are compared to determine if, for example, Alice is within one foot, five feet, or 10 feet of Bob. In some implementations, the threshold proximity/location for detection of the occurrence of a shared event is that Alice is at least within one foot of Bob or that Bob is at least within one foot of Alice.

The following are example shared events that can be detected by system 100 based on certain analysis functions performed by system 100: 1) a group of friends/users having dinner together and system 100 analyzes location, GPS, or proximity data signals transmitted by each user device to detect that a first user is within a threshold proximity of other users in a subset; 2) in a shared event, one of the participants/ user is looking up information on the internet and system 100 detects that a particular web search is being performed while a first user is within a threshold proximity of another user in the subset of users; 3) a group of users within the subset are going to the cinema jointly and system 100 detects that one of the attendants/user searched for movie show times of a particular movie being shown at a theater that is within a threshold proximity of another user in the subset of users; 4) a group of users within a subset are attending a party and system 100 analyzes calendar events, or email/ messaging communications stored in each user device to detect that a first user is attending the same party/social event as other users in the subset; 5) a group of users are in the same general area and digital images, videos, or photos captured by a user device of a user in the subset are geo-tagged and scanned by system 100 to detect that other users within the subset are either viewable within the captured digital image/video or are within a threshold proximity of the location in which the images/videos were captured.

Additional example shared events and corresponding analysis functions of system 100 can include: 6) an online gaming session, e.g., type of game, time/date game is played, console used to play the game, etc., in which data transmissions associated with the session are received and analyzed by system 100 to detect that users within a subset are associated with the same computer game or gaming session; 7) a video conference or virtual meeting and system 100 scans/analyzes the meeting invite list or other data attributes associated with the virtual meeting to detect or determine that at least two users of the subset or each associated with the same online meeting/video conference; 8) noise levels occurring a particular entertainment venue and system 100 analyzes data signals associated with ambient noise levels transmitted by user devices to detect that a first user is in a noise environment, e.g., at a concert, that is within a threshold decibel level of other users in the subset; 9) a group of users are in the same general area and system 100 receives and analyzes movement sensor data signals— e.g., abrupt/erratic acceleration data indicative of a roller coaster ride at an amusement park—transmitted by a user device of a user in the group and detects that that the user shares movement sensor data that overlaps with, or substantially matches, movement data associated with other users in the subset; 10) a group of users at a shared sports activity such as a running event and system 100 analyzes location, GPS, or proximity data signals as well as sports app data signals transmitted by each user device to detect that a first user is participating in the same sports activity as other users in the subset.

Module 218 can be configured to access data associated with the application programs of user device 104*a/b/c* to detect or determine whether the shared event is associated with a physical environment or a virtual environment. Additionally, module 218 can include at least one probability module that utilizes program code, such as machine learning algorithms, and that receives and analyzes multiple data signals associated with the application programs of user device 104*a/b/c*. The probability module can be used to develop predictive models that detect or determine the occurrence of a shared event within a certain degree of accuracy. In some implementations, based on outcomes calculated by the predictive models, a probability metric can be generated that indicates the probability that a shared event is taking place or has taken place between a subset of users. System 100 can also be programmed or trained to indicate the occurrence of a shared event in response to the probability metric exceeding a threshold probability metric.

In some implementations, system 100 can receive, analyze, and correlate the data signals across users that share a connection. In general, the above-mentioned probability metric can correspond to a likelihood of the occurrence of a shared event. Hence, the likelihood that a shared event is taking place or took place can increase based on the determined probability metric exceeding a threshold probability metric. In some implementations, system 100 can determine the likelihood, i.e., generating the probability metric, in a variety of ways, including application of machine learning principles. For example, certain machine learning principles, such as integration of neural networks or logistic regression, can be applied to standard correlation measures. More particularly, a shared event probability module of system 100 can include a set of adjusted thresholds, or a cascade of programmed triggers.

As discussed above, a variety of data signals can be transmitted to system 100 from user device 104*a/b/c*. Hence, in some implementations, the thresholds or programmed triggers can initiate in response to system 100 detecting certain similarity factors associated with data signal parameter values that are evaluated or compared by server 108 or module 216. Machine learning based probability modules of system 100 can then be adjusted or trained based on a set of collected positive and negative use case models. For example, positive use case modules can include one or more actual detected shared events based on overlapping/matching parameter values and confirmation from user 102*a/b* indicating that Alice is indeed with Bob or that Bob is indeed with Alice. Negative use case models can include one or more false positive or incorrect shared event detections based on marginally overlapping/matching parameter values and/or no confirmation from user 102*a/b* indicating that Alice is with Bob or that Bob is with Alice.

FIG. 3 is a flow diagram of an example process 300 for automatic detection of an event shared among at least two users of a user group. At block 302 of process 300, system 100 receives data indicating a current context of a first user 102*a*—Alice. In some implementations, the current context can indicate that Alice is at Morton's Steakhouse on a Friday night around 8 pm eastern standard time (EST). The data signals can be received from/provided by a first computing device 104*a* that is associated with Alice. For example, Alice, while waiting at Morton's, can launch, from her mobile device 104*a*, an example application program, "Event app," associated with processes executed by system 100. Alice can then grant Event app permission to access, at least, a location app and a contacts app on her mobile device and transmit Alice's location data and contacts to server 108.

At block 304, system 100 identifies, based on the current context of first user 102*a*, a subset of users 102*a/b*—Alice and Bob from a set of users 102*a/b/c*—Alice, Bob, and Charlie associated with the first user 102*a*. For example, Bob may also have Event app loaded on his mobile device 104*b* and may also have granted permissions to Event app to access Bob's location app, contacts app, or social media account. In this example, system 100 scans Alice's contact list and locates contact information associated with Bob. Likewise, system 100 scans Bob's contact list and locates contact information associated with Alice. System 100 can then determine that Alice and Bob share a connection based on the corresponding located contact information. In response to detecting that a shared connection exists between Alice and Bob, system 100 then forms a subset of users that includes Alice and Bob.

At block 306, system 100 receives, from a second computing device 104*b* associated with at least one other user, namely Bob, of the subset of users 102*a/b*, data indicating a current context of the at least one other user. For example, as discussed above, the current context can indicate that Bob is also at Morton's Steakhouse on a Friday night around 8 pm EST. Likewise, Bob, while also waiting at Morton's, can launch, from his mobile device 104*b*, Event app and transmit his location data to server 108.

At block 308, system 100 compares the current context of the first user 102*a*—Alice with the current context of the at least one other user 102*b*—Bob. For example, system 100 can compare data signals associated with GPS/location data transmitted to server 108 from Alice's mobile device with data signals associated with GPS/location data transmitted to server 108 from Bob's mobile device.

At block 310, based on the comparing step at block 308, system 100 determines that a shared event is presently occurring or has occurred. System 100 detects or determines the occurrence of a shared event among users 102*a/b* in response to determining that Alice is within a threshold proximity of Bob or that Bob is within a threshold proximity of Alice. The threshold proximity for detection of a shared event can be that Alice, while at Morton's, is at least within 10 feet of Bob or that Bob, while at Morton's, is at least within 10 feet of Alice. In certain implementations, shared events can be physical events in which Alice and Bob are co-located, or virtual events in which a group of users participate jointly in an example online activity such as a video conference or an online gaming session.

At block 312, system 100 indicates at least to the first user 102*a*, that the shared event is presently occurring or has occurred. For example, system 100 can cause the Event app to display a notification, e.g., shown via UI 124, to Alice or to Bob, e.g., shown via UI 126, or to both Alice and Bob. The notification can include a sample text statement indicating that system 100 has detected that Alice is with Bob or that Bob is with Alice. In some implementations, the notification can also include information indicating the type of shared event/activity, "dinner @ Morton's Steakhouse," and temporal data associated with the shared event. The temporal data can include a date and current time or a date and a time span of the shared event. Example time spans include: 1) from this evening until now; 2) since 1 hour ago; 3) until now, 4) still on-going; 5) or since 8 pm until 10 minutes ago).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus.

Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system.

A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Figure 4:
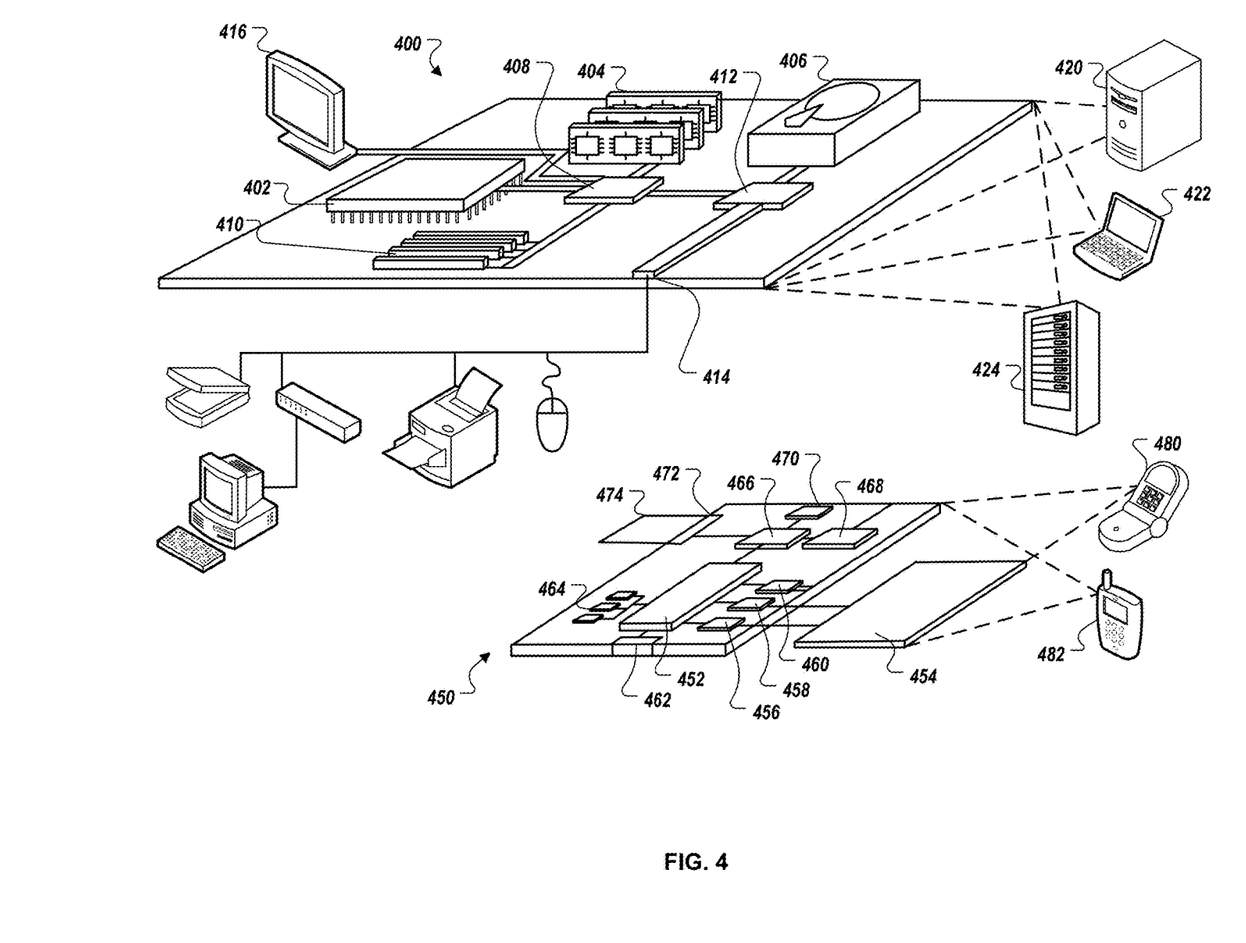
FIG. 4 is a block diagram of a computing system that can be used in connection with computer-implemented methods described in this specification.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 606, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 600 may be connected, with each device providing portions of the necessary operations, e.g., as a server bank, a group of blade servers, or a multi-processor system.

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416, e.g., through a graphics processor or accelerator, and to high-speed expansion ports 410, which may accept various expansion cards (not shown). In the implementation, low-speed controller 412 is coupled to storage device 406 and low-speed expansion port 414. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication, e.g., via a docking procedure, or for wireless communication, e.g., via Bluetooth or other such technologies.

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound, e.g., voice messages, music files, etc., and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
   receiving, by a computing system and from a first computing device associated with a first user, data indicating a current context of the first user;
   determining that an ad hoc, shared event that is not scheduled and involves the first user and at least one other user who has a social connection with the first user that precedes an occurrence of the shared event, is presently occurring or has occurred, comprising:
      receiving, by the computing system and from a second computing device associated with at least one other user of a subset of users who each have a social connection with the first user that precedes the occurrence of the shared event, data indicating a current context of the at least one other user, and
      comparing, by the computing system, the current context of the first user with the current context of the at least one other user who has a social connection with the first user that precedes the occurrence of the shared event;
   in response to comparing, determining a time-span of the ad hoc, shared event that involves the first user and the at least one other user based on the respective data indicating the current context of the first user and the at least one other user, wherein a first time of the time-span coincides with a beginning of the ad hoc, shared event that is not scheduled; and
   generating, by the computing system, an indication that is displayed at the first computing device of the first user, wherein the indication (i) describes that the shared event is presently occurring or has occurred, (ii) identifies the at least one other user as a participant in the shared event, and (iii) identifies the first time of the time span as being associated with the beginning of the ad hoc, shared event.

2. The method of claim 1, comprising:
   identifying the subset of users based on information about social connections in a social network of the first user; and
   determining, by the computing system, that a user of the subset of users has the social connection to the first user.

3. The method of claim 2, wherein the social connection indicates that the user has at least one of corresponded with the first user, is a contact in a device of the first user, or is one of associated with a social network of the first user or connected in a social network of the first user.

4. The method of claim 1, wherein comparing the current context of the first user with the current context of the at least one other user comprises:
   receiving, by the computing system, a first set of data signals from the first computing device of the first user and a second set of data signals from the second computing device of the at least one other user; and
   detecting, by the computing system, an overlap in a value associated with the first set of data signals and a value associated with the second set of data signals, the overlap indicating a probability of an occurrence of the shared event.

5. The method of claim 4, wherein the first set of data signals and the second set of data signals each include data signals corresponding to at least one of location data, ambient noise level data, digital beacon data, digital image data, internet activity data, or digital communications data.

6. The method of claim 4, wherein determining whether the shared event is presently occurring or has occurred comprises, detecting, that the probability of the occurrence of the shared event exceeded a threshold probability.

7. The method of claim 6, wherein generating the indication comprises:
generating the indication in response to the computing system detecting that the probability of the occurrence of the shared event exceeded the threshold probability.

8. The method of claim 1, wherein the shared event is at least one of:
associated with a physical location or associated with a virtual computing environment.

9. The method of claim 1, wherein the current context of the first user includes a virtual environment and the current context of the at least one other user includes a virtual environment;
wherein comparing the current context of the first user with the current context of the at least one other user comprises comparing the virtual environment of the first user with the virtual environment for the at least one other user; and
the method comprises determining that a shared event is presently occurring or has occurred based on comparing the virtual environment of the first user with the virtual environment for the at least one other user.

10. The method of claim 9, wherein the virtual environment for the first user and the virtual environment for the at least one other user each include at least one computing session that is shared between the first user and the at least one other user; and
the method comprises determining that a shared event is presently occurring or has occurred based on determining that the at least one computing session is shared between the first user and the at least one other user.

11. The method of claim 1, wherein comparing the current context of the first user with the current context of the at least one other user comprises:
determining an overlap between: (i) one or more activities of the first user that occur in a virtual environment, and (ii) one or more activities of the at least one other user that occur in a virtual environment, wherein the overlap comprises participation of the first user and the at least one other user in a game, an audio or video teleconference, a media broadcast or presentation, a virtual meeting, or an online activity;
the method comprises determining that a shared event is presently occurring or has occurred based on determining the overlap.

12. The method of claim 1, wherein the current context of the first user includes (i) a virtual environment comprising one or more computing sessions and (ii) a physical environment comprising a geographical location;
wherein the current context of the at least one other user includes (i) a virtual environment comprising one or more computing sessions and (ii) a physical environment comprising a geographical location;
wherein comparing the current context of the first user with the current context of the at least one other user comprises (i) comparing the virtual environment of the first user with the virtual environment for the at least one other user and (ii) comparing the geographical location of the first user with the geographical location of the at least one other user; and
the method comprises determining that a shared event is presently occurring or has occurred based on (i) comparing the virtual environment of the first user with the virtual environment for the at least one other user and (ii) comparing the geographical location of the first user with the geographical location of the at least one other user.

13. The method of claim 4, wherein comparing the current context of the first user with the current context of the at least one other user comprises:
determining, by a predictive module of the computing system, one or more similarity factors that are generated based on a computed overlap between respective signal values of the first set of data signals and respective signal values of the second set of data signals; and
detecting, by the predictive module, that each of the one or more similarity factors exceed a threshold similarity factor, each threshold similarity factor corresponding to one of multiple programmed triggers that are used by the predictive module to indicate a probability of an occurrence of the ad hoc, shared event that is not scheduled.

14. An electronic system comprising:
one or more processing devices;
one or more non-transitory machine-readable storage devices storing instructions that are executable by the one or more processing devices to cause performance of operations comprising:
receiving, by the electronic system and from a first computing device associated with a first user, data indicating a current context of the first user;
determining that an ad hoc, shared event that is not scheduled and involves the first user and at least one other user, who has a social connection with the first user that precedes an occurrence of the shared event, is presently occurring or has occurred, comprising:
receiving, by the electronic system and from a second computing device associated with at least one other user of a subset of users who each have a social connection with the first user that precedes the occurrence of the shared event, data indicating a current context of the at least one other user, and
comparing, by the electronic system, the current context of the first user with the current context of the at least one other user who has a social connection with the first user that precedes the occurrence of the shared event;
in response to comparing, determining a time-span of the ad hoc, shared event that involves the first user and the at least one other user based on the respective data indicating the current context of the first user and the at least one other user, wherein a first time of the time-span coincides with a beginning of the ad hoc, shared event that is not scheduled; and
generating, by the electronic system, an indication that is displayed at the first computing device of the first user, wherein the indication (i) describes that the shared event is presently occurring or has occurred, (ii) identifies the at least one other user as a participant in the shared event, and (iii) identifies the first time of the time span as being associated with the beginning of the ad hoc, shared event.

15. The electronic system of claim 14, wherein the operations comprise:
identifying the subset of users based on information about social connections in a social network of the first user; and
determining, by the electronic system, that a user of the subset of users has the social connection to the first user, and wherein the connection indicates that the user has at least one of corresponded with the first user, is a contact in a device of the first user, or is one of associated with a social network of the first user or connected in a social network of the first user.

16. The electronic system of claim 14, wherein comparing the current context of the first user with the current context of the at least one other user comprises:

receiving, by the electronic system, a first set of data signals from the first computing device of the first user and a second set of data signals from the second computing device of the at least one other user; and detecting, by the electronic system, an overlap in a value associated with the first set of data signals and a value associated with the second set of data signals, the overlap indicating a probability of an occurrence of the shared event.

17. The electronic system of claim 16, wherein the first set of data signals and the second set of data signals each include data signals corresponding to at least one of location data, ambient noise level data, digital beacon data, digital image data, internet activity data, or digital communications data.

18. One or more non-transitory machine-readable storage devices storing instructions that are executable by one or more processing devices to cause performance of operations comprising:

receiving, by a computing system and from a first computing device associated with a first user, data indicating a current context of the first user;

determining that an ad hoc, shared event that is not scheduled and involves the first user and at least one other user who has a social connection with the first user that precedes an occurrence of the shared event, is presently occurring or has occurred, comprising:

receiving, by the computing system and from a second computing device associated with at least one other user of a subset of users who each have a social connection with the first user that precedes the occurrence of the shared event, data indicating a current context of the at least one other user, and comparing, by the computing system, the current context of the first user with the current context of the at least one other user who has a social connection with the first user that precedes the occurrence of the shared event;

in response to comparing, determining a time-span of the ad hoc, shared event that involves the first user and the at least one other user based on the respective data indicating the current context of the first user and the at least one other user, wherein a first time of the time-span coincides with a beginning of the ad hoc, shared event that is not scheduled; and generating, by the computing system, an indication that is displayed at the first computing device of the first user, wherein the indication (i) describes that the shared event is presently occurring or has occurred, (ii) identifies the at least one other user as a participant in the shared event, and (iii) identifies the first time of the time span as being associated with the beginning of the ad hoc, shared event.

19. The one or more non-transitory machine-readable storage devices of claim 18, wherein the operations comprise:

identifying the subset of users based on information about social connections in a social network of the first user; and determining, by the computing system, that a user of the subset of users has the social connection to the first user, and wherein the connection indicates that the user has at least one of corresponded with the first user, is a contact in a device of the first user, or is one of associated with a social network of the first user or connected in a social network of the first user.

20. The one or more non-transitory machine-readable storage devices of claim 18, wherein comparing the current context of the first user with the current context of the at least one other user comprises:

receiving, by the computing system, a first set of data signals from the first computing device of the first user and a second set of data signals from the second computing device of the at least one other user; and detecting, by the computing system, an overlap in a value associated with the first set of data signals and a value associated with the second set of data signals, the overlap indicating a probability of an occurrence of the shared event.

21. The one or more non-transitory machine-readable storage devices of claim 20, wherein the first set of data signals and the second set of data signals each include data signals corresponding to at least one of location data, ambient noise level data, digital beacon data, digital image data, internet activity data, or digital communications data.

* * * * *